UNITED STATES PATENT OFFICE.

RALPH H. McKEE, OF NEW YORK, N. Y

PROCESS OF OXIDIZING GASES.

1,391,332.   Specification of Letters Patent.   Patented Sept. 20, 1921.

No Drawing. Application filed April 5, 1919, Serial No. 287,740. Renewed February 10, 1921. Serial No. 444,001.

*To all whom it may concern:*

Be it known that I, RALPH H. McKEE, a citizen of the United States, and a resident of New York, in the county of New York and State of New York, have invented certain new and useful Improvements in Processes of Oxidizing Gases, of which the following is a specification.

This invention relates to novel processes of oxidizing gases and contemplates the use, in the above mentioned processes of a catalytic material not heretofore used for this or any similar purpose.

The object of the invention is to provide a cheap, convenient and effective process by which gases generally may be oxidized, and one of the principal objects is to provide a process whereby nitrogen which has been initially oxidized may be rapidly brought to a higher degree of oxidation.

As is well known nitric oxid (NO) may be produced in a variety of ways such as by the oxidation of ammonia, by the action of the electric arc on gas mixtures containing nitrogen and oxygen as in the Birkeland-Eyde and Schoenherr processes, or by subjecting oxygen-nitrogen mixtures to high temperatures obtained by the combustion of fuel, with or without explosion. When in any of the above processes the object desired is the production of nitric acid, the nitric oxid is further oxidized to nitrogen peroxid ($NO_2$ or $N_2O_4$). In the presence of water, under suitable conditions, nitrogen peroxid forms nitric acid.

In the reaction of nitrogen peroxid upon water, some nitric oxid is formed, the reaction apparently taking place as follows

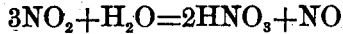

$$3NO_2 + H_2O = 2HNO_3 + NO$$

An oxidation of the nitric oxid so produced is thus rendered necessary, this oxidation being followed by a treatment with water to absorb the nitrogen peroxid, and the oxidizing and absorbing steps are continued alternately until substantially complete conversion to nitric acid is effected. In practice the water is usually introduced as dilute nitric acid.

It has been shown that certain catalysts promote the oxidation of nitric oxid and I have found that a particularly effective and satisfactory catalyst for this purpose is hydrated silica gel. If, for example, a solution of water glass is acidified and the resulting silicic acid collected and washed and dried at somewhat elevated temperatures, there is produced a material which is admirably adapted to serve as a catalyst in the above process. When gases containing nitric oxid and a sufficient quantity of oxygen are passed through a space containing the catalyst, a substantially complete conversion to nitrogen peroxid is rapidly effected. In one form of my invention, the gas stream flows through a series of chambers in which it is alternately exposed first to the action of silica gel and then to the absorbing action of water or dilute nitric acid, but I do not wish to be limited to such a series of steps nor to any particular order of oxidizing and absorbing operations. Since the oxidation of NO to $NO_2$ is exothermic, there will be no cooling of the gases in contact with the catalyst and hence no deposition of water in the catalytic chamber. The gases should be reasonably dust-free to avoid contamination of the catalyst.

The hydrated silica gel may be used alone or in conjunction with other catalysts and while the invention is above described in connection with the oxidation of nitric oxid it will be understood that I do not limit myself to this application, the scope of the invention being limited only by the appended claims. The term oxygen, as used in the claims comprehends not only free oxygen, but oxygen which exists in chemical combinations capable of releasing it.

I claim:

1. The process of oxidizing gases which comprises passing said gases together with a sufficient amount of oxygen in contact with a catalyst comprising hydrated silica gel, substantially as described.

2. The process of oxidizing gases which comprises passing said gases together with a sufficient amount of oxygen in contact with a catalyst comprising sensibly dry hydrated silica gel, substantially as described.

3. The process which comprises passing a gas stream containing a lower gaseous oxid capable of forming a higher oxid, together with a sufficient amount of oxygen to effect such oxidation, in contact with a catalyst comprising hydrated silica gel, substantially as described.

4. The process which comprises passing a gas stream containing a lower gaseous oxid capable of forming a higher oxid, together with a sufficient amount of oxygen to effect such oxidation, in contact with a catalyst comprising sensibly dry hydrated silica gel, substantially as described.

5. The process which comprises passing a gas stream containing nitric oxid together with a sufficient quantity of oxygen in contact with a catalyst comprising hydrated silica gel, substantially as described.

6. The process which comprises passing a gas stream containing nitric oxid together with a sufficient quantity of oxygen in contact with a catalyst comprising sensibly dry hydrated silica gel, substantially as described.

In testimony whereof I affix my signature.

RALPH H. McKEE.